Oct. 12, 1965 R. F. PODLESNY 3,212,010

INCREASING FREQUENCY PULSE GENERATOR FOR INDICATING PREDETERMINED TIME INTERVALS BY THE NUMBER OF OUTPUT PULSES

Filed Feb. 25, 1963

INVENTOR.
Robert F. Podlesny
BY
Paul J. Ethington
ATTORNEY 3,212,010
Patented Oct. 12, 1965

3,212,010

INCREASING FREQUENCY PULSE GENERATOR FOR INDICATING PREDETERMINED TIME INTERVALS BY THE NUMBER OF OUTPUT PULSES

Robert F. Podlesny, Santa Barbara, Calif., assignor to General Motors Corporation, Detroit, Mich., a corporation of Delaware Filed Feb. 25, 1963, Ser. No. 260,486
3 Claims. (Cl. 328—41)

This invention relates to a signal generator and, more particularly, to a means for generating a series of pulse signals having a predetermined frequency-time relation.

The basic objective of the present invention is to provide a digital signal generator for producing output signals over a succession of time intervals wherein the number of pulses occurring in any interval is related to the number of the predetermined time interval. Thus, upon reception and accumulation of the generated signal pulses, it is possible to discern very accurately the number of time intervals which have accumulated. It is also possible to determine the number of any particular time interval by countin the number of pulses which have occurred during that interval.

In general, this is accomplished by the combination of a plurality of bistable signal generating means which are interconnected such that one of the output channels for each of the bistable generators forms the input circuit to the succeeding bistable generator. In this fashion the frequency of the changes in state of each of the bistable devices will be an inverse function of the number of binary devices separating a particular binary device from a source of synchronizing signals, such as a clock generator. Additionally one of the output channels of each of the bistable devices is interconnected with one or more of a plurality of gating means such that predetermined coded combinations of the gating means are activated or enabled to produce an output signal after predetermined numbers of time base signals have occurred. The output signals of the combination of gating means are, in turn, mutually connected to a selective gating means which is responsive to the output signals of the gating means to produce an output signal whenever a predetermined output signal combination exists between the aforementioned gating means.

Figure 1:
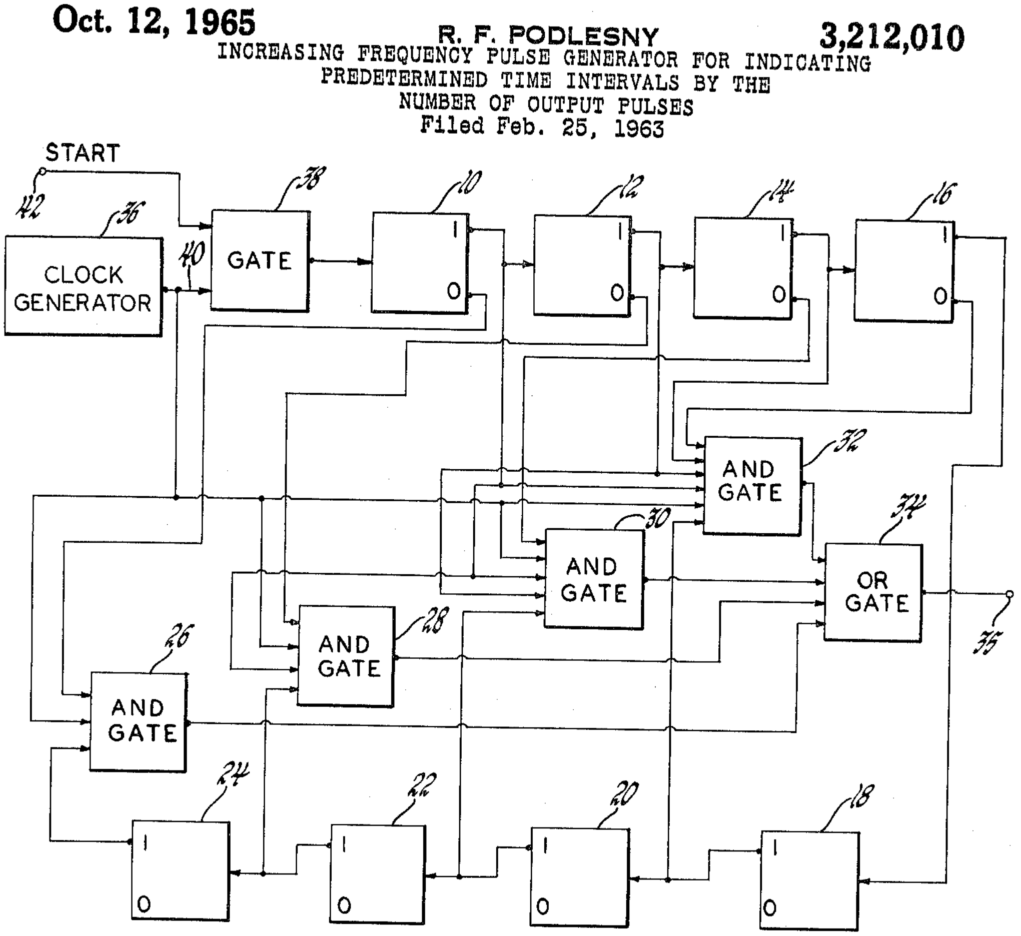
Figure 2:
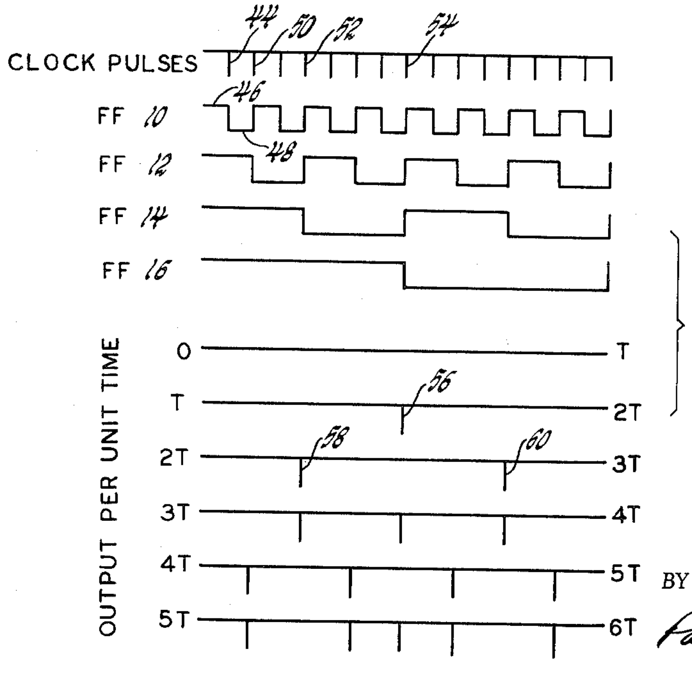

The present invention and the mode of operation thereof may be more readily understood upon reference to the following specification which is to be taken with the accompanying drawings of which:

FIGURE 1 is a block diagram of an array of components illustrating the basic theory of the invention; and FIGURE 2 shows the nature and time relationship of the output signals for the various components of FIGURE 1.

Referring now to FIGURE 1, the illustrative embodiment of the present invention is seen to comprise 2N tandem connected bistable multivibrators, more commonly known as flip-flop circuits. The first N flip-flop circuits are numbered 10, 12, 14 and 16, and comprise the so-called high frequency bank of flip-flops. The second N flip-flops comprising a low frequency bank of flip-flops are numbered 18, 20, 22 and 24. In the illustrative embodiment there are 8 flip-flops and thus N equals 4; however, the invention is not limited to this number. Each of the flip-flop circuits 10 through 24 has a single input signal channel and two complementary output signal channels. Each of the bistable flip-flops is responsive to an input signal of a predetermined character to switch the state of the flip-flip to produce an output signal on the opposite output channel from that which was previously activated. It will be apparent to those skilled in the art that this is a conventional mode of operation for a bistable multivibrator device.

Each of the flip-flops 10 through 24, thus, is capable of producing an output signal on one of two output signal channels. In each of the flip-flops these output channels are designated either as "one" or "zero" in the traditional binary marking fashion. It may further be observed that the tandem connection of the flip-flop circuits is accomplished via the "one" output signal channel of each of the flip -flops by electrically connecting that channel with the input circuit of the succeeding flip-flop. More specifically, the "one" output channel of flip-flop 10 is interconnected with the input channel of flip-flop 12. The "one" output of flip-flop 12 is interconnected with the input channel of flip-flop 14 and so on. In addition the illustrative embodiment comprises N multi-input AND gates numbered 26, 28, 30 and 32. The gates are interconnected in a predetermined fashion with the outputs of the 2N flip-flops and are described below. The AND gates 26, 28, 30 and 32 may be constructed in a known fashion and are adapted to produce an output signal only when all of the input signal channels are properly activated. Each of the AND gates 26, 28, 30 and 32 is interconnected with a different number of output channels from the flip-flops. The output channels of the AND gates are, in turn, mutually connected to the input channels of a multi-input OR gate 34. The OR gate 34 may also be constructed in a commonly known fashion to be adapted to produce an output signal on an output terminal 35 when only one of the input channels thereto is properly energized. A source of synchronizing pulses is provided in the form of a clock generator 36 which, in the illustrative embodiment, produces pulses at a constant frequency. The clock generator 36 is connected to a first input 40 of a gate circuit 38 which, in turn, is connected to the primary flip-flop 10. A second input 42 to the gate circuit 38 is connected to a source (not shown) of initiating or reset signals. The output of the clock generator 36 is connected to a first input of each of the AND gates 26, 28, 30 and 32 such that none of the gates may be energized or enabled except upon the occurrence of a signal pulse from the clock generator 36.

Considering now the circuit of FIGURE 1 in greater detail, it has been previously stated that the "one" output signal channel of each of the flip-flops is interconnected with the input channel of the succeeding flip-flop. The first N flip-flops 10, 12, 14 and 16 have the "zero" output channels thereof interconnected in order with a second input channel of the AND gates 26, 28, 30 and 32, respectively. The second N flip-flops 18, 20, 22 and 24 have the "one" output channels thereof connected in reverse order to a third input of the AND gates 26, 28, 30 and 32. More particularly, the "one" output of flip-flop 24 is connected to an input of gate 26, the "one" output of flip-flop 22 is connected to an input of gate 28, and so on. The "one" output signal channel of flip-flop 10, in addition to being interconnected with the input channel of flip-flop 12, is also interconnected with a fourth input channel of each of the AND gates 28, 30 and 32. The "one" output signal channel of flip-flop 12, in addition to being interconnected with the input channel of flip-flop 14, is also interconnected to a fifth input channel of each of the AND gates 30 and 32. Similarly, the "one" output signal channel of flip-flop 14 is interconnected both with the input channel of flip-flop 16 and a sixth input channel of AND gate 32. In summary, the "one" outputs of each of the first N flip-flops are connected to additional inputs of each of the AND gates subsequent in order to that AND gate to which the "zero" output of the flip-flop is connected. Accordingly, no flip-flop has both the "one" and "zero" outputs connected to the same gate. The zero channels of flip-flops 18, 20, 22 and 24 are not connected into the system.

Summarizing briefly, it has been stated that the AND gates 26, 28, 30 and 32 will be effective to produce an output signal only when all of the input signal channels thereto are simultaneously energized. Thus, AND gate 26 will produce no output signal unless there is a simultaneous reception of output signals from the "zero" signal channel of flip-flop 10, the clock generator 36, and the "one" output signal channel of flip-flop 24. Considering AND gate 28, it may be seen that there will be no output signal produced therefrom, unless there is a simultaneous reception of input signals from the "zero" output channel of flip-flop 12, the clock generator 36, the "one" output signal channel of flip-flop 10 and the "one" output signal channel of flip-flop 22. Similarly, the five input channels to AND gate 30, which must be simultaneously energized before there will be an output signal produced therefrom, comprise the "zero" channel of flip-flop 14, the clock generator 36, the "one" output channel of flip-flop 10, the "one" output channel of flip-flop 12 and the "one" output channel of flip-flop 20. Finally, the input signal channels for gate 32 comprise the "zero" channel of flip-flop 16, the clock generator 36 and the "one" output signal channel of each of the flip-flops 10, 12, 14 and 18.

*Operation*

Considering now the operation of the circuit of FIGURE 1, it may be assumed that each of the flip-flops is initially in such a state as to be producing an output signal on the "zero" output channel. In this condition, it may be seen that the AND gates 26, 28, 30 and 32 will all be disabled from signal transmission due to the fact that there is no input signal from each of the associated flip-flops 24, 22, 20 and 18, respectively. Thus, there will be no input signal to the OR gate 34, and no signal will appear on the output terminal 35. It may further be assumed that in the conventional flip-flop circuits, such as those used in the implementation of this invention, each of the flip-flops is responsive only to a negative-going input signal to change the output signal state.

When it is desired to activate the pulse train generator of FIGURE 1 to initiate the train of output pulses, the gate 38 may be triggered open by a start signal applied to an initial triggering input 42 as shown in the drawings. The gate 38 may be of such a nature that upon the occurrence of a first signal on the input 42 the gate will be opened and will remain open until there occurs a second signal at input 42.

When gate 38 is enabled by a first start pulse on input 42, flip-flop 10 immediately begins to receive a series of negative periodic pulses from the clock generator 36. These pulses are illustrated in FIGURE 2 under the appropriate heading "Clock Pulses." It will be noted that in FIGURE 2, each of the time intervals represented by one line is equal to a fundamental period of sixteen clock pulses. Upon the occurrence of a first clock pulse 44 applied to the input of flip-flop 10, the flip-flop 10 will be switched from a state in which an output signal on the "zero" channel is produced to a state in which an output signal on the "one" channel is produced. This is represented on the second line of FIGURE 2 in which flip-flop 10 is shown to have switched from the "zero" state, as represented by level 46, to the "one" state, as represented by level 48. The wave form appearing on line FF 10 of FIGURE 2 may, thus, be taken to represent the output appearing at the "zero" signal channel of flip-flop 10. Accordingly, a change in state of flip-flop 10 from the "zero" state to the "one" state is effective to produce a positive-going signal pulse which will be transmitted to the input channel of flip-flop 12. As previously mentioned, the flip-flops are only responsive to a negative-going signal to change in state; therefore, flip-flop 12, as well as all the other flip-flops, persists in the production of a "zero" output channel signal. It will be seen that in view of the absence of a signal from any of the flip-flops 18, 20, 22 or 24, none of the AND gates 26, 28, 30 and 32 will be energized. Accordingly, there will be neither an input signal to nor an output signal from the OR gate 34.

Upon the occurrence of a second clock pulse 50 as shown in FIGURE 2, flip-flop 10 will again reverse its output state and produce a "zero" output signal. The absence of the "one" output signal, thus, constitutes a negative-going signal which is applied to the input of flip-flop 12. This negative-going input signal to flip-flop 12 is effective to trigger a reversal in state of flip-flop 12 to produce a "one" signal. Therefore, after the occurrence of the second clock pulse 50, flip-flop 10 is in the "zero" state, flip-flop 12 is in the "one" state. However, as yet, none of the flip-flops 18, 20, 22 or 24 are effective to activate any of the AND gates 26, 28, 30 or 32. Accordingly, there will be no output signal on terminal 35.

Reference to FIGURE 2 shows that after a fourth clock pulse 52, the negative-going signal from flip-flop 12 is effective to reverse the state of flip-flop 14. Similarly, an eighth clock pulse 54 produces a negative-going signal on the "one" output signal channel of flip-flop 14 which is effective to reverse the output state of flip-flop 16. The generalized result of the so-called tandem-connected flip-flop circuits is that the frequency of changes in output state of any of the flip-flops is one-half the frequency of the immediately preceding flip-flop. Accordingly, the cycle length of flip-flop 10 is two pulses, the cycle length of flip-flop 12 is four pulses, the cycle length of flip-flop 14 is eight pulses, and so on. It may be seen that during the first basic time interval, within which sixteen clock pulses are generated by the generator 36, none of the AND gates are enabled to produce an input signal to the OR gate 34. Accordingly, during the first interval T, as indicated by the sixth line of FIGURE 2, there will be no output signal on terminal 35. However, upon the occurrence of the seventeenth clock pulse, flip-flop 16 will deliver a negative-going signal to the input of flip-flop 18 which will be effective to produce a "one" signal from the output channel of flip-flop 18. This "one" signal will be communicated to the AND gate 32 and will persist for the entire half cycle length of flip-flop 18, i.e., sixteen clock pulses. During the second basic interval between T and 2T, the twenty-fourth clock pulse will occur. At this time, flip-flops 10, 12, 14, 16 and 18 are all in the "one" state. Therefore, all of the six input channels to the AND gate 32 are simultaneously energized, and an output signal from gate 32 will occur. This output signal is communicated to the appropriate input channel of the OR gate 34. Since, as yet, flip-flops 20, 22 and 24 are producing no output signal on the "one" channels thereof, gates 26, 28 and 30 will be disabled. Accordingly, gate 34, receiving but one input signal, will produce an output signal 56, which appears on terminal 35.

Referring again to FIGURE 2, it will be seen that during the third time interval between 2T and 3T, flip-flop 20 will be activated to produce a "one" output. This "one" output from flip-flop 20 will be communicated to one of the input channels of gate 30. Upon the occurrence of the thirty-sixth and forty-fourth clock pulses during the third time interval, two output pulses 58 and 60 are produced on output terminal 40. The output pulses 58 and 60 will occur whenever there is a "one" output from flip-flops 10, 12 and 20, a clock pulse, and a "zero" output from flip-flop 14. With these five signals occurring simultaneously on the input channels of AND gate 30, the gate 30 is properly energized to supply the input signal to the OR gate 34.

By a continued analysis of the circuit of FIGURE 1, it may be similarly shown that during the fourth interval between 3T and 4T, three output pulses are produced on terminal 40. Thereafter, as shown in FIGURE 2, the number of pulses which occur in any basic interval of sixteen clock pulses is equal to one less than the number of that interval. Thus, the output signal train consists of a series of zero, one, two, three, four, etc., in which the number of pulses occurring during any time interval is proportional to the number of the interval.

While the present invention has been described with reference to a fundamental circuitry illustration, it is to be understood that additions and modifications may be made to this circuit without departing from the spirit and scope of the invention. For example, if it is desired to alter or multiply the length of the basic time interval and, thus, the number of pulses occurring in that interval, one might insert one or more bistable circuits intermediate the high and low frequency banks of flip-flops. It will be appreciated that a single bistable multivibrator, inserted between flip-flops 16 and 18, and not interconnected with the logic gates will alter the output signal train such that only one output pulse will be produced during both the first and second time intervals consisting of sixteen clock pulses. Similarly, only two pulses will be produced during the third and fourth basic intervals of sixteen clock pulses. Further multiplication may be accomplished by the addition of further flip-flop circuits. These flip-flops are known as "idlers" in that they are not interconnected with the logical gates. Additionally, it may be desirable to provide by-pass or triggering circuitry for the idler multivibrators, such that the multiplication factor may be changed at will. It is further to be understood that during the normal operation of the subject device some form or reset circuitry may be provided in the form of a feedback path between the output terminal 35 and the triggering input 40. Accordingly, for a definition of the present invention, reference should be had to the appended claims.

What is claimed is:

1. Apparatus for producing a signal pulse train in which the number of pulses occurring in successive time intervals increases as a function of the number of intervals elapsed comprising 2N bistable signal generators each having an input and first and second complementary signal outputs, N being an integer, a synchronizing source of pulses connected to the input of the first of the generators, means connecting the generators in tandem relation via the first signal outputs to produce frequency division, N multi-input AND gates each having an output energizable when all of the inputs are energized, the source being connected to a first input of each of the N AND gates, the second outputs of the first N tandem connected generators following said synchronizing source being connected in order to respective second inputs of the N AND gates, the first outputs of the remaining N tandem connected generators being connected in reverse order to a third input of the N AND gates, the first outputs of each of the first N generators being connected to additional inputs of each of the AND gates subsequent in order to that gate to which the second output of the generator is connected, and a multi-input OR gate with the outputs of the AND gates being connected to respective inputs thereof.

2. Apparatus as defined in claim 1 wherein the synchronizing source is a clock generator for producing pulses at a constant frequency.

3. Apparatus for producing a signal pulse train in which the number of pulses occurring in successive time intervals increases as a function of the number of intervals elapsed comprising first, second, third, fourth, fifth, sixth, seventh and eighth bistable multivibrators each having an input and first and second complementary outputs, a signal source of pulses connected to the input of the first multivibrator, means connecting the multivibrators in tandem relation via the first outputs thereof to produce frequency division, first, second, third and fourth multi-input AND gates each having an output energizable where all of the inputs are energized, the signal source being connected to a first input of each of the gates, the second outputs of the first through fourth multivibrators being connected in order to respective second inputs of the first through fourth AND gates, the first outputs of the fifth through eighth multivibrators being connected in reverse order to a third input of the first through fourth AND gates, the first output of the first multivibrator being connected to a fourth input of each of the second, third and fourth AND gates, the first output of the second multivibrator being connected to a fifth input of each of the third and fourth AND gates, the first output of the third multivibrator being connected to a sixth input of the fourth AND gate, and a multi-input OR gate with the outputs of the AND gates being connected to respective inputs thereof.

References Cited by the Examiner

UNITED STATES PATENTS 3,035,187 5/62 Reichert ............ 307—88.5

ARTHUR GAUSS, *Primary Examiner*.